Feb. 27, 1940. E. G. BENNETT 2,192,123
DETERMINATION OF HYDROGEN-ION CONCENTRATION
Filed Sept. 9, 1936
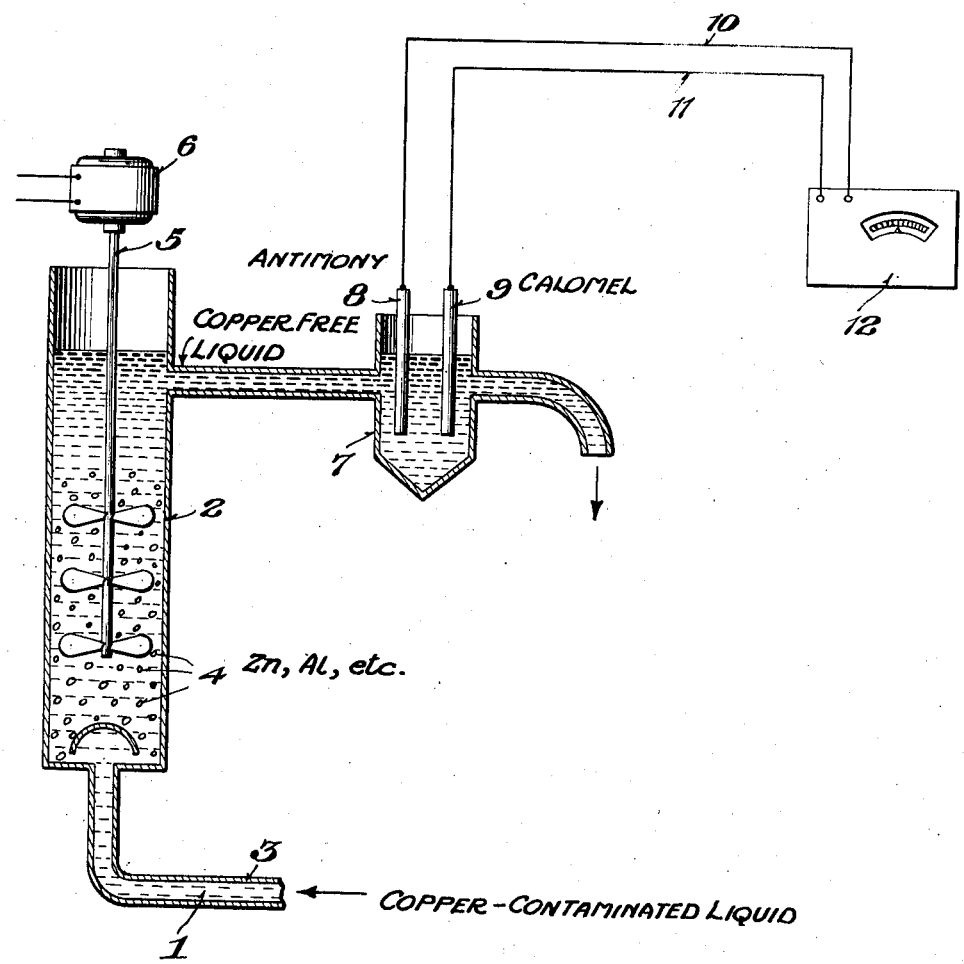

Patented Feb. 27, 1940

2,192,123

UNITED STATES PATENT OFFICE 2,192,123

DETERMINATION OF HYDROGEN-ION CONCENTRATION

Eugene G. Bennett, Hamilton, Ohio, assignor to The Champion Paper and Fibre Company, Hamilton, Ohio, a corporation of Ohio Application September 9, 1936, Serial No. 100,028

3 Claims. (Cl. 204—1)

This invention relates to determination of hydrogen-ion concentration; and it comprises a method for the accurate determination of hydrogen-ion concentrations in liquids ordinarily containing traces of copper with the aid of an antimony electrode cell, including the step of freeing the liquid of copper prior to passing it to such a cell; all as more fully hereinafter set forth and as claimed:

One convenient way of determining hydrogen-ion concentrations or pH in liquids is with the aid of the antimony electrode cell. Such a cell has for one electrode an element of antimony while the other electrode usually comprises calomel. A potentiometer connected across the electrodes measures the E. M. F. of the cell. The E. M. F. developed by such a cell is a measure of hydrogen-ion concentration and the potentiometer is usually calibrated directly in terms of pH.

For many purposes this device is highly successful by reason of its general accuracy and also the wide range of pH covered. On the other hand, attempts to use it for pH determinations of liquids occurring in a paper mill have not been satisfactory. In paper mill operation it is necessary to measure the pH of such liquors as beater charges and white waters. Antimony electrode cells used in the ordinary way fail to give consistent or reliable results in such cases.

One object achieved in the present invention is the provision of a method and apparatus for making accurate and reliable pH measurements with the aid of antimony electrode cells; especially in connection with paper mill problems.

I have discovered that the inconsistent results obtained by the use of antimony electrode cells with paper mill liquors are due to the presence of small amounts of dissolved copper in the liquors under examination. Mere traces of copper in solution; quantities as low as 0.3 part per million parts water (0.3 milligram per liter); are sufficient to make antimony electrode pH determinations erratic and uncertain. In paper mill liquors copper is frequently present in amounts greater than this, probably as a result of corrosion of the brass and copper or copper alloy equipment which is widely used in paper making.

According to the invention I obviate the deficiencies of the cell and secure accurate and reliable measurements, by removing copper from the liquor, or at least reducing the proportion of copper to less than 0.3 part per million or thereabouts, prior to introducing the liquor into the cell. This is advantageously done by simply bringing the liquor into contact with particles of metallic zinc, aluminum or other metal which is higher than copper in the electro-chemical series. Any other suitable method of removing the copper may be employed. By removing the copper from the liquor to be measured prior to passage to the antimony electrode device, reliable and reproducible results are obtained. Using zinc, aluminum, etc., as described, the solution of the metal in exchange for copper does not appreciably affect the pH of the solution.

In the accompanying drawing I have shown diagrammatically one form of apparatus suitable for carrying out the invention.

Liquor to be tested, indicated at 1, enters a decoppering chamber 2 through a pipe 3. The decoppering vessel 2 may be of any suitable size, shape and material, e. g. glass, and contains a number of small particles 4 of zinc, aluminum, or other suitable metal or metals. Advantageously the metal may be in the form of small pellets or shot. Zinc is usually the most convenient metal. It need not be amalgamated. As stated, the solution of the zinc in exchange for copper does not appreciably affect the pH of the solution. An agitator 5 driven by a small motor 6 is arranged to provide agitation to ensure good contact of the liquor with the metal particles. The liquor passes out near the top of the vessel 2 into an antimony electrode cell having a jar 7. Partially immersed in the jar is a rod of antimony 8 which comprises one of the electrodes. The other electrode, shown diagrammatically at 9, is a calomel electrode which may be of any standard construction. In place of the calomel electrode any other suitable reference electrode may be used. Lead wires 10 and 11 connect the antomony electrode and the calomel electrode to a suitable device for measuring E. M. F. such as a potentiometer 12 of the usual type.

The apparatus may be used on paper mill liquors and other materials containing dissolved copper to obviate the inconsistencies and irregularities that are encountered when the copper is not removed.

The decoppering means shown is particularly adapted for the treatment of paper mill liquors which often contain fibers and other matter in suspension which has a tendency to filter out. If the liquor to be treated contains no coarse suspended matter it can merely be passed through a body of stationary metal particles without danger of plugging.

What I claim is:

1. A method of improving and regularizing antimony electrode determininations of pH in aqueous liquors containing traces of soluble copper, which comprises bringing a portion of the liquor into contact with particles of a metal which is electropositive with respect to copper and which upon going into solution does not appreciably affect the pH of the liquor, so as to remove dissolved copper from the liquor, and passing decoppered liquor to an antimony electrode pH measuring cell, where the measurement takes place, whereby regular and consistent pH determinations are secured despite variations in the traces of copper initially present in the liquors.

2. The method of claim 1 wherein said metal is aluminum.

3. A method of improving and regularizing antimony electrode determinations of pH in aqueous liquors containing traces of soluble copper, which comprises bringing a portion of the liquor into contact with particles of metallic zinc so as to remove dissolved copper from the liquor, and passing decoppered liquor to an antimony electrode pH measuring cell, where the measurement takes place, whereby regular and consistent pH determinations are secured despite variations in the traces of copper initially present in the liquors.

EUGENE G. BENNETT.